US012776806B2

(12) United States Patent
Bagga et al.

(10) Patent No.: US 12,776,806 B2
(45) Date of Patent: Oct. 27, 2026

(54) RECEIVER

(71) Applicant: Novelda AS, Kviteseid (NO)

(72) Inventors: Sumit Bagga, Kviteseid (NO); Torleif Skår, Kviteseid (NO)

(73) Assignee: Vitalthings UWB AS, Trondheim (NO)

( * ) Notice: Subject to any disclaimer, the term of this patent is extended or adjusted under 35 U.S.C. 154(b) by 251 days.

(21) Appl. No.: 18/718,640

(22) PCT Filed: Dec. 13, 2022

(86) PCT No.: PCT/EP2022/085695
§ 371 (c)(1),
(2) Date: Jun. 11, 2024

(87) PCT Pub. No.: WO2023/110924
PCT Pub. Date: Jun. 22, 2023

(65) Prior Publication Data

US 2025/0055500 A1 Feb. 13, 2025

(30) Foreign Application Priority Data

Dec. 13, 2021 (GB) ...................................... 2118014

(51) Int. Cl.
*H04B 1/719* (2011.01)
*G01S 7/483* (2006.01)
(Continued)

(52) U.S. Cl.
CPC .............. *H04B 1/719* (2013.01); *G01S 7/483* (2013.01); *H04B 1/48* (2013.01); *H04L 5/1461* (2013.01); *H04B 2201/7163* (2013.01)

(58) Field of Classification Search
CPC .. H04B 1/719; H04B 1/48; H04B 2201/7163; H04B 1/525; G01S 7/483; G01S 7/282;
(Continued)

(56) References Cited

U.S. PATENT DOCUMENTS 9,319,027 B1 * 4/2016 Rafi .................. H03H 11/0466
2016/0127005 A1 * 5/2016 Nan ..................... H04B 1/0458
455/83

(Continued)

OTHER PUBLICATIONS

International Search Report and Written Opinion for International Application No. PCT/EP2002/085695, 13 pages, mailed Apr. 3, 2023.

(Continued)

*Primary Examiner* — Cheikh T Ndiaye
(74) *Attorney, Agent, or Firm* — Klarquist Sparkman, LLP

(57) ABSTRACT

A differential transceiver circuit coupled to a single antenna interface, the transceiver circuit comprising: a differential pair of signal paths, comprising a first signal path and a second signal path; differential amplifier, having an input arranged to receive a receive signal from the antenna interface; a differential transmitter arranged to generate a differential pair comprising a first transmit signal connected to the first signal path and a second transmit signal connected to the second signal path; a switching network arranged to divert the amplifier output on the second signal path to a signal ground node. The receive signal on one signal path is diverted to ground. The transmit signal corresponding to the other differential signal path is inserted so that the same transmit signal is present on both differential signal paths. When processed by differential downstream components with high common-mode rejection, the transmit signals cancel out.

32 Claims, 8 Drawing Sheets

(51) Int. Cl.
*H04B 1/48* (2006.01)
*H04L 5/14* (2006.01)

(58) Field of Classification Search
CPC ... G01S 7/285; G01S 13/0209; H04L 5/1461; H03F 3/195; H03F 2200/294; H03F 2200/451; H03F 2203/45386; H03F 2203/45394
See application file for complete search history.

(56) References Cited

U.S. PATENT DOCUMENTS

2018/0219519 A1* 8/2018 Schober .................. H03F 1/083
2020/0336119 A1 10/2020 Bagga

OTHER PUBLICATIONS

Search Report under Section 17(5), Application No. GB2118014.6, 3 pages, May 23, 2022.

* cited by examiner

RECEIVER

CROSS REFERENCE TO RELATED APPLICATIONS

This is the U.S. National Stage of International Application No. PCT/EP2022/085695, filed Dec. 13, 2022, which was published in English under PCT Article 21(2), which in turn claims the benefit of Great Britain Application No. 2118014.6, filed Dec. 13, 2021.

The invention relates to a receiver front-end, in particular it relates to a radio frequency (RF) front-end for a pulsed or impulse radar such as an ultra-wideband (UWB) radar.

UWB pulsed radars are often used for short range sensing such as proximity, presence and gesture detection, and heart rate and respiration monitoring. In such scenarios, the target to be detected can be very close to the radar, e.g., within a few centimeters, or even a few millimeters. A (strong) reflection from the target (or reflector) will then be received by the radar in a very short space of time after transmission, or even while transmission is still ongoing.

While a reflected signal from such a close target will still be very strong, the receiver architecture is designed for and must be capable of amplifying a reflection from significantly greater distance and therefore of much lower amplitude. The weak reflected signal is boosted by a high gain amplifier, typically a low-noise amplifier (LNA) and may also be accumulated over multiple individual pulses so as to reinforce the reflected signal while averaging out noise. A filter may be placed before the LNA to reject (unwanted) out-of-band signals.

The requirement for a high gain amplifier in the receiver hinders the design of the radar architecture in certain ways. In particular, the transmitter must be high powered to generate pulses with sufficiently large voltage swing so that reflections can be received from a required range. If those high power transmit pulses are fed to the amplifier of the receiver, they can damage the circuitry. Therefore, design is typically limited to either a two-port (2-port) full-duplex design (a transmitter driving a first antenna and a receiver amplifying signal from a second antenna) or a single-port (1-port) half-duplex design in which the receiver and transmitter share an antenna, but the receiver's amplifier is switched OFF or blocked during transmission to protect it from the high power transmit pulse. A 1-port transceiver design is beneficial in terms of form factor as each antenna can take up a lot of physical area. For example, where all the processing can be done on-chip, the antennae make up the majority of the overall device area. Therefore, removing one antenna can almost halve the device area (particularly important for incorporation into small and/or portable devices such as laptops, tablets, mobile telephones or wearable devices or other devices where space is constrained, e.g., the bezel around a display screen). However half-duplex operation restricts near-zero range detection as no reflections can be received (in the receiver's high gain mode) until after the transmitter has finished transmitting and the receive path has been switched back ON.

According to the invention there is provided a differential transceiver circuit for transmitting and receiving via a single antenna interface, the transceiver circuit comprising:

- a differential pair of signal paths, comprising a first signal path and a second signal path;
- a differential amplifier, having an input and an output, the input arranged to receive a receive signal from the antenna interface;

- a differential transmitter arranged to generate a differential pair of transmit signals for transmission to the antenna interface, the differential pair of transmit signals comprising a first transmit signal connected to the first signal path between the antenna and the receiver input and a second transmit signal connected to the second signal path between the antenna and the receiver input;
- a switching network on the second signal path arranged on the output side of the differential amplifier and arranged to divert the amplifier output on the second signal path to a signal ground node; and
- an injection circuit arranged to inject a copy of the first transmit signal onto the second signal path downstream of the switching network.

In this document, "downstream" is used to refer to the receive signal direction, i.e., with the antenna being at the most upstream location and with receive signal proceeding downstream from the antenna through the amplifier to the load. It will be appreciated that the transmit signal goes in the opposite direction from the transmitter to the antenna, but any transmit signal that passes through the amplifier is also in a downstream direction.

From the transmitter, the first and second transmit signals are transmitted both to the antenna (for pulse transmission) and through the differential amplifier towards the processing circuitry. However, this transmission of large signals through the amplifier is undesirable and is what gives rise to the half-duplex operation in single antenna designs as the transmit signal swing is too large for downstream components to handle. Hence, in previous designs, the amplifier has simply been switched OFF during transmit mode so as to protect downstream components. With the above architecture, however, during transmit mode (i.e., while the transmitter is transmitting), the differential circuit is essentially switched into a single-ended receive mode. The receive signal (and unwanted transmit signal) on one signal path of the differential circuit is diverted to ground and therefore not available for further processing. In its place, the transmit signal corresponding to the other differential signal path is inserted so that the same transmit signal (with the same polarity) is present on both differential signal paths. Thus, when the differential signal is processed by differential downstream components with high common-mode rejection, the transmit signals on the two differential signal paths (i.e., of the same polarity) cancel out, leaving just the receive signal on one signal path to be processed. This allows the receive signal to be received and processed throughout transmission and therefore allows pseudo-full-duplex operation. We refer to this as pseudo-full-duplex rather than full-duplex as the architecture requires a switch from differential to single-ended receive operation and therefore only receives a fraction (e.g., half) of the signal strength that it can receive during full differential receive mode (i.e., any time when the transmitter is inactive).

It will be appreciated that the arrangement described here is a direct-RF front end, i.e., the RF signal is received and processed directly without any frequency conversion. In such arrangements the filtering is particularly important to restrict the receive signal to just the signal of interest while excluding out-of-band interferers. In some cases, filtering can be achieved with just the antenna, but for direct-RF arrangements this is usually not sufficient and so a dedicated filter is required. By way of example only, in some direct-RF front ends the filter and amplifier try to realize around 60 dB attenuation out-of-band with a noise figure<5 dB.

There are different ways in which the receive signal path can be diverted to signal ground and different ways in which the first transmit signal is connected onto the signal path. For example, a selector switch could be used to determine whether to connect the receive signal to the output or to signal ground. However, in some preferred embodiments the switching network comprises a first switch arranged to selectively connect the second signal path to a transceiver circuit output, and a second switch arranged to selectively connect the second signal path to the signal ground node. The use of two switches, one for each connection makes for fast and convenient operation with transistor switches. For example, in some examples these switches are FETs (e.g., MOSFETs) for fast switching operation. Normally these two switches are in opposite states (i.e., when one is ON the other is OFF and vice versa) so that the signal is only sent along one onward path. Both switches can of course be switched OFF to block onward signal transmission completely, e.g., if half-duplex operation is desired.

In preferred embodiments the injection circuit comprises an injection switch arranged to selectively connect the injection circuit to the second signal path. The injection of the first transmit signal onto the second differential signal path can thus be controlled selectively so that it is only injected during pseudo-full-duplex operation, e.g., during transmit mode. During normal receive mode (i.e., when the transmitter is OFF), there is no need for the injection circuit and it is therefore separated (the injection switch is OFF) so that a full differential receive signal can pass along the second path for improved signal reception.

The copy of the first transmit signal can be obtained in different ways. In some embodiments the injection circuit obtains the copy of the first transmit signal directly from the differential transmitter. Obtaining the signal directly from the differential transmitter is advantageous as the identity of the first transmit signal on both differential signal paths can be ensured more accurately. In such embodiments the transmit signals provided onto both the first differential signal path and the second differential signal path are both generated by the same transmitter circuit and therefore the waveform (e.g., amplitudes, phases, etc.) are identical at source. This may be achieved using a splitter or a transformer in the transmitter to duplicate the signal. The copy of the signal is unconnected with the main differential signal paths and so does not (and cannot) have any receive signal present through the injection circuit. Also, in this way the injection circuit path does not affect the main differential signal path.

In other embodiments the injection circuit may comprise a dummy transmitter circuit substantially identical to one differential half of the differential transmitter, and which is arranged to generate the copy of the first transmit signal. Although this requires an additional transmitter circuit (and is therefore inefficient in area terms), it keeps the injection path completely isolated from the main transmit architecture and therefore has no effect on the main transmitter itself.

Whichever way the copy of the transmit signal (required for cancellation) is generated (directly or indirectly via a dummy transmitter), it is important to ensure that the generated transmit signal is processed identically in the injection path as it is in the main first differential signal path. This is to ensure that any alterations in amplitude and/or phase on one version are mimicked in the other version. Keeping the two versions as identical as possible is important for ensuring that they can be canceled accurately and completely in later processing. Any differences will result in incomplete cancellation and therefore degradation of the actual receive signal (e.g., indicative of a reflection from a target object in a radar implementation). Accordingly, in some embodiment the injection path comprises a dummy amplifier. The dummy amplifier is preferably substantially identical to one differential half of the differential amplifier. This ensures that the signals on the injection path and the first differential signal path are amplified in exactly the same way and thus influenced (e.g., amplified) to the same degree so that they should cancel completely (or as near completely as possible) in later processing, e.g., in a circuit with high common-mode rejection.

As the injection path is separate from the first transmit path, the impedance that it sees is different to that of the first differential signal path. In particular, the first differential signal path is connected to the antenna so that the first transmit signal can be sent out as an RF waveform. The injection path on the other hand is not connected to the antenna. This difference results in different impedances on each transmit signal path which can create differences between the two signals. Therefore, in some preferred embodiments the injection path comprises an impedance matching network arranged to match the impedance seen by the copy of the first transmit signal on the injection path to the impedance seen by the first transmit signal on the first signal path. The impedance matching network can be used to mimic the impedance at the point where the transmit signal is inserted (as well as any other impedance differences between the two paths) and can therefore be used to adjust the impedances of the two paths to be identical (or near identical). Once again this ensures that the transmit signal on each of the first and second differential signal paths ends up being as identical as possible for later cancellation. Preferably the impedance matching network is trimmable. A trimmable (i.e., adjustable) network means that the transceiver circuit can be tuned during calibration so as to ensure correspondence of the transmit signals passing along the first differential signal path and the injection path. Calibration may involve sending a known waveform along each path, comparing them, and adjusting the trimmable impedance matching network until the difference is zero or as near-zero as can reasonably be achieved. The impedance matching network is preferably a resistive-capacitive network. While inductors could also be used in the impedance matching network, it is preferred to use just a resistive-capacitive network as inductors are large and costly to add to on-chip circuits. On the other hand, resistors and capacitors are relatively inexpensive on-chip and are sufficient to allow adjustment of both the real and imaginary components of impedance so as to ensure correspondence of the transmit signals as discussed above. In some embodiments, where adding inductors is not an issue or where they provide the best matching, the impedance matching network may be a resistive-capacitive-inductive network.

The differential transceiver circuit may further comprise a controller, the controller arranged such that, during a transmit pulse, it: controls the switching network to divert the amplifier output on the second signal path to the signal ground node; and controls the injection circuit to inject the copy of the first transmit signal onto the second signal path. The controller can be used to switch the differential transceiver circuit between different modes, e.g., between a receive mode (fully-differential receive mode) and a transmit mode (single-ended receive mode). The controller may additionally be able to switch the differential transceiver circuit into a half-duplex mode in which the receiver is switched OFF during transmission.

The switching network may comprise a first circuit branch which comprises a first buffer element in series with the first switch. The first buffer element serves to buffer the signal through the first circuit branch. In normal operation, this provides high output impedance (as seen from the load) and reverse isolation, i.e., to isolate the load connected to the output from the input and guarantee unconditional stability. The first buffer element may be a non-switchable element configured to be in an always-ON configuration. The isolation provided by the first buffer element prevents any changes in load from impacting any impedance matching upstream (i.e., closer to the antenna). In addition, the load conditions (e.g., frequency selectivity) remain unaffected. This has the benefit that the frequency response of the receiver remains the same regardless of operating mode. Even when the only signal through the buffer element is via the injection circuit, the frequency response retains the same shape. This facilitates subsequent processing of the signal. It will be appreciated that when the first switch is a transistor it can also provide amplification to the signal in addition to providing its function of switching off the circuit branch to the transceiver circuit output. Thus, the first switch may be an integral part of the amplifier. Equally, the first buffer element could be made to be switchable as well, but this is not necessary given the presence of the first switch. The first buffer element may also be a switchable element (such as a transistor) configured so as to be in an always-ON configuration. The first buffer element may be a unity gain buffer, or it may be an amplifier to provide additional gain if desired.

The first buffer element may be connected between the first switch and the transceiver circuit output. The first buffer element may be a single stage or a cascade of stages. For a single stage, it may comprise a field effect transistor (FET).

In some examples, the first switch and the first buffer element each comprise transistors in a common-gate (CG) arrangement (i.e., current buffers). Thus, the second signal path comprises a common-gate configured transistor as the first switch, with its drain connected to the source of a common-gate configured transistor as the first buffer element. The drain of the first buffer element can also be directly connected to the transceiver circuit output. The first buffer element provides the reverse isolation while the first switch provides the ON/OFF control of the second path from the amplifier as well as acting as a current buffer (with low input impedance and high out impedance). The first buffer element (e.g., a non-switching CG-stage) buffers signal from the first switch to the load.

The switching network may comprise a second circuit branch which comprises a second buffer element in series with the second switch. The second buffer element may be connected between the second switch and the signal ground node. The second buffer element may be a unity gain buffer, or it may be an amplifier to provide additional gain if desired.

The second switch and the second buffer element may each comprise transistors in a common-gate arrangement. The second buffer element may be a unity gain buffer, or it may be an amplifier to provide additional gain if desired.

The second switch may be identical to the first switch. Identical here means to have the same characteristics so that the first and second switches have the same effect on the circuit when they are used as alternatives. In practice, this means that the first and second switches may have the same physical dimensions. They may be made from the same material with the same doping. They may be transistors with the same threshold voltage.

The second buffer element may be identical to the first buffer element so as to provide the same characteristics when the second signal path is diverted to ground and when it is not diverted to ground.

The transceiver circuit can be operated in different modes by either sending the second signal path to the transceiver circuit output or replacing it with the signal from the injection circuit. In some embodiments the transceiver circuit further comprises a controller; wherein the controller is arranged to operate in at least a transmit mode and a receive mode; wherein in the transmit mode, the controller controls the switching network to divert the amplifier output on the second signal path to the signal ground node and controls the injection circuit to inject the copy of the first transmit signal onto the second signal path; and wherein in the receive mode, the controller controls the switching network not to divert the amplifier output on the second signal path to the signal ground node and controls the injection circuit not to inject the copy of the first transmit signal onto the second signal path.

In the transmit mode, the transmitter is active and provides a strong signal on both the first signal path and the second signal path. In order to prevent damage to downstream components, the second signal path is controlled to divert the signal (or at least the majority of it) to the signal ground node while replacing it with a copy of the transmit signal on the first signal path (the first transmit signal) such that the first transmit signal is common to both the first and second signal paths while the receive signal is present (in single-ended form) only on the first transmit path. In the receive mode, the second signal path is controlled to pass the signal (or at least the majority of it) from the differential amplifier to the transceiver circuit output for onwards processing. In this mode, the transmitter is not active and so the only signal present at the transceiver circuit output is the (wanted) received small signal from the antenna in differential form on both the first signal path and the second signal path. In this mode, maximum differential signal strength is achieved.

In some embodiments the differential amplifier is an impedance matching amplifier arranged to receive the receive signal from the antenna interface and arranged to output an amplified differential signal on the first and second signal paths. The impedance matching amplifier provides transconductance gain (i.e., voltage to current conversion). The impedance matching amplifier can be designed so that the correct impedance match is one of its characteristics, while still providing gain to the input signal (on each differential path). In preferred embodiments there is no switch upstream of the impedance matching amplifier. No such switch is required as the selectivity that allows for half-duplex or pseudo-full duplex operation is downstream of the impedance matching amplifier.

The impedance matching amplifier may have two differential halves and each differential half may comprise a transistor or multiple transistors arranged in a common-gate and/or a common-source arrangement. One way to achieve this is with a field effect transistor arranged in either common-gate or common-source configuration, with the windings of a trifilar transformer coupling the signal between at least the gate and the source, while ensuring that there is only coupling between two of its windings (which ensures stability and/or maximum gain). This arrangement allows additional characteristics, such as the turns ratio of the windings and the coupling coefficient to impact on the impedance matching. Therefore, the amplifier can be designed for both gain and impedance matching. While a trifilar arrangement is particularly convenient and area-efficient, a similar effect can also be achieved with two transformers (bifilars).

It will be appreciated that this amplifier is necessarily provided upstream of (i.e., closer to the antenna than) the switching network, and therefore, it will see the full power of the transmit signal when the transceiver is in transmit mode. Thus, this transistor (on each differential signal path) can be designed to be sufficiently robust to handle the large-signal swing from the transmitter. It will be appreciated that as this is the first amplifier in the receive path, it has not yet amplified the transmitter signal and so is the least problematic part of the receive path. The signal downstream of this amplifier has been amplified, and thus, becomes a reliability issue (i.e., risks damaging downstream components). This arrangement is of particular benefit in pulsed transceivers, e.g., pulsed, or impulse radars. In such systems (as opposed to continuous wave transceivers) the transmitter is only active for short periods of time (to transmit a pulse) before going inactive for long periods of time (the rest of the pulse repetition period). Thus, the power that must be withstood by the amplifier is short and transient and thus a sufficiently robust transistor can be incorporated without great expense. The arrangement is especially beneficial in low-power transceivers, e.g., UWB transceivers as the transmit power restrictions in the UWB band also facilitate the use of an amplifier element that is fully exposed to the full transmit power of the transmitter.

Note that the single common-gate or common-source transistor mentioned above can be replaced by multiple transistors acting as a transconductance stage. For example, the gain stage could be a circuit (commonly referred to as a Darlington pair) comprising two transistors with the source of the first transistor connected to the gate of the second transistor, and the drains of the two transistors connected. Another example being a common-source transistor and a common-gate transistor in parallel arrangement with the source of the common-gate transistor connected to the gate of the common-source transistor and with the drains of the two transistors connected via an 'inversion'. Other multiple transistor arrangements are also possible.

The transistor of each differential half may comprise a field effect transistor and each differential half of the impedance matching amplifier may further comprise a transformer coupling the signal between the gate and the source of the field effect transistor. This coupling provides an additional gain mechanism by applying the signal at the gate to the source or vice-versa. By arranging the transformer in an inverting relationship, the gate-source voltage is increased, thereby increasing the gain of the transistor.

In some examples, the field effect transistor is in common-source arrangement and each differential half of the impedance matching amplifier comprises a transformer arranged to increase the amplitude of the signal at the gate of the field effect transistor.

In such examples, the transformer on each differential signal path may be a trifilar transformer with a primary winding connected to the source, a secondary winding connected between the gate and signal ground and a tertiary winding connected between the secondary winding and the gate, wherein the primary winding and the secondary winding are coupled in inverting relationship, wherein the secondary winding and the tertiary winding are coupled to increase voltage at the gate, and wherein there is substantially no coupling between the primary winding and the tertiary winding. With this arrangement, the coupling between the primary and secondary windings increases the gate-source voltage as discussed above, thereby providing one gain mechanism. At the same time, the coupling between the secondary and tertiary windings further increases the gate voltage (and therefore also the gate-source voltage), thereby providing an additional gain mechanism. At the same time, as the input impedance of the arrangement depends upon both the transconductance of the transistor and the turns ratios of the transformer, it is possible to achieve good impedance matching via a well-defined input impedance as well as high gain. More details of this type of arrangement can be found in WO2018/033743, the entire contents of which are incorporated herein by reference. A similar effect may be achieved by using two bifilar transformers instead of a trifilar. This may be achieved with one bifilar providing coupling between the source and the gate (equivalent to the primary and secondary of the trifilar), and one bifilar providing coupling to increase the gate voltage (equivalent to the secondary and tertiary of the trifilar).

In other examples, the field effect transistor may be in common-gate arrangement and each differential half of the impedance matching amplifier may comprise a transformer coupling the signal between the source and the drain of the field effect transistor. This source-drain coupling provides an additional gain mechanism by applying the signal (current) sensed at the drain back to the source. By arranging the transformer in a non-inverting relationship, the drain-source current is increased, thereby increasing the gain of the transistor.

In such examples, the transformer on each differential signal path may be a trifilar transformer with a primary winding connected to the source, a secondary winding connected to the gate and a tertiary winding connected to the drain, wherein the primary winding and the secondary winding are coupled in an inverting relationship and wherein the primary winding and the tertiary winding are coupled in non-inverting relationship, and wherein there is substantially no coupling between the secondary winding and the tertiary winding. With this arrangement, the coupling between the primary and secondary windings increases the gate-source voltage as discussed above, thereby providing one gain mechanism. At the same time, the coupling between the primary and tertiary windings increases the drain-source current, thereby providing an additional gain mechanism. At the same time, as the input impedance of the arrangement depends upon both the transconductance of the transistor and the turns ratios of the transformer, it is possible to achieve good impedance matching via a well-defined input impedance as well as high gain. More details of this type of arrangement can be found in WO2019/086853, the entire contents of which are incorporated herein by reference. A similar effect may be achieved by using two bifilar transformers instead of a trifilar. This may be achieved with one bifilar providing coupling between the source and the gate (equivalent to the primary and secondary of the trifilar), and one bifilar providing coupling between the source and the drain (equivalent to the primary and tertiary of the trifilar).

According to another aspect of the invention, there is provided a transceiver comprising: a transmitter circuit, an antenna, a transceiver circuit as discussed above (optionally including any of the preferred or optional features also discussed above). The transmitter circuit may comprise an impulse or pulse generator.

According to another aspect of the invention, there is provided a pulsed radar comprising a transceiver as discussed above.

According to another aspect of the invention, there is provided a method of duplex operation of a differential transceiver circuit via a single antenna interface, wherein the transceiver circuit comprises:

a differential pair of signal paths, comprising a first signal path and a second signal path; and a differential amplifier, having an input and an output, the input arranged to receive a differential receive signal from the antenna interface;

the method comprising:

transmitting a differential signal to the antenna interface, comprising a first transmit signal on the first signal path and a second transmit signal on the second signal path;

receiving a differential receive signal on the differential pair of signal paths via the antenna interface;

diverting the receive signal on the second signal path from the output side of the differential amplifier to a signal ground node; and injecting a copy of the first transmit signal onto the second signal path in place of the diverted receive signal.

All of the preferred and optional features described above in relation to the apparatus may equally be applied in relation to the method and therefore further description thereof is omitted here.

Certain preferred embodiments of the invention will now be described, by way of example only, and with reference to the accompanying drawings in which:

FIGS. 1*a* and 1*b* show two direct-RF front-end topologies;

FIG. 2 shows a prior art common-source low-noise amplifier arrangement for half-duplex operation;

FIG. 3 schematically shows a transceiver circuit according to an embodiment of the invention;

Figure 1A:
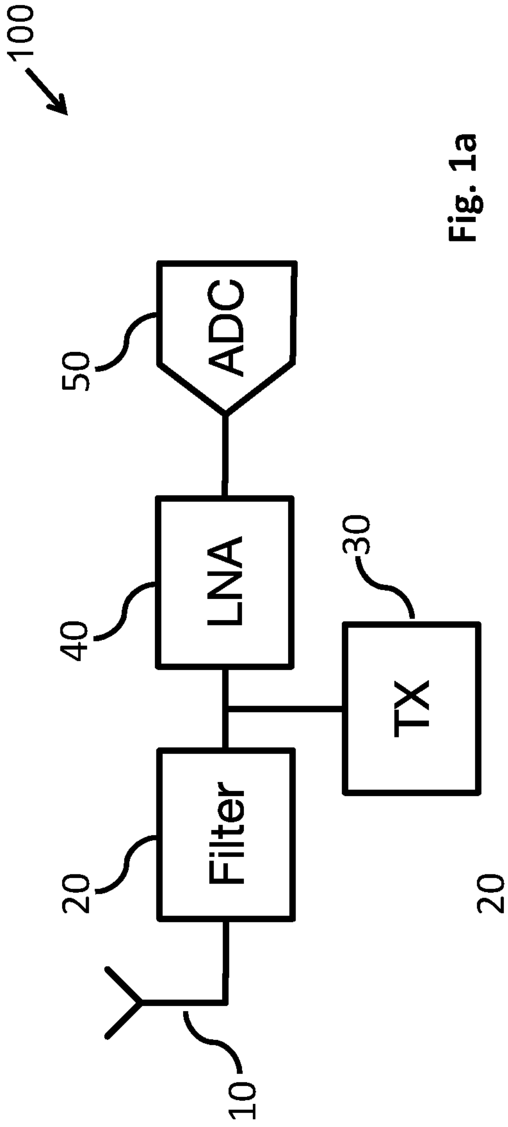
Figure 1B:
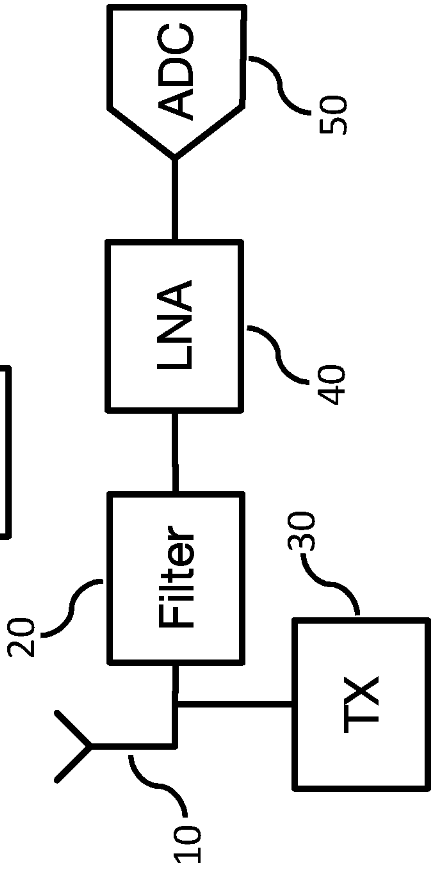

FIGS. 1*a* and 1*b* show two different general arrangements for a direct-RF radio frequency (RF) transceiver front-end 100. Both of these arrangements are single-port devices, i.e., they have a single antenna 10 that is used for both transmission and reception. Each front-end 100 has an antenna 10, a filter 20, a low-noise amplifier (LNA) 40, an analog-to-digital converter (ADC) 50 and a transmitter 30. As these are direct-RF front ends there are no mixers for up/down conversion. In FIG. 1*a*, the transmitter 30 is connected to a node between the filter 20 and the LNA 40 while in FIG. 1*b* it is connected between the antenna 10 and the filter 20. The difference between these arrangements is in whether the output from the transmitter 30 gets filtered by the filter 20. Both of these arrangements are viable for the embodiments described below. Each has advantages. The advantage of the arrangement in FIG. 1*a* is that the transmitter 30 signal is filtered by the filter 20. This helps to ensure that the transceiver output meets frequency transmission requirements. For example, for an UWB (ultra-wide band) transmitter, there is a spectrum mask that must be adhered to. Applying the filter 20 to the output of the transmitter 30 helps to filter out frequencies that would violate the spectrum mask. However, the filter 20 also results in a certain degree of attenuation. Ideally the filter 20 is transparent to the signals of interest (both outgoing and incoming), but in reality, there is always an insertion loss associated with any passive filter 20. Therefore, placement of the filter 20 as in FIG. 1*a* means that the transmitter 30 must be higher powered in order to make optimum use of the available spectrum mask (or alternatively, for a given power, the range of the device is compromised by the insertion loss in the filter 20). The full power of the transmitter 30 is also then seen by the receiver parts of the circuit, i.e., the LNA 40 and ADC 50. A higher-powered transmitter 30 can risk damaging these components and therefore placement of the transmitter 30 as in FIG. 1*a* requires either limiting the power of the transmitter 30 or taking greater precautions to protect the LNA 40 and ADC 50. With the arrangement of FIG. 1*b* the full power of the transmitter 30 is available to the antenna 10 without loss, but it is unfiltered, hence potentially compromising the spectrum efficiency of the transmitter 30 or requiring additional filtering to be built into the transmitter 30 and/or antenna 10 at extra cost and complexity. However, with this arrangement the output of the transmitter 30 that is seen by the LNA 40, and the ADC 50 is first filtered and thus attenuated by the filter 20, thereby protecting those components somewhat from the high power of the transmitter 30. Such protection is still not generally enough to prevent damage to the LNA 40 and/or ADC 50 from the high signal swing of the transmitter 30, so additional protective measures are still normally required.

Figure 2:
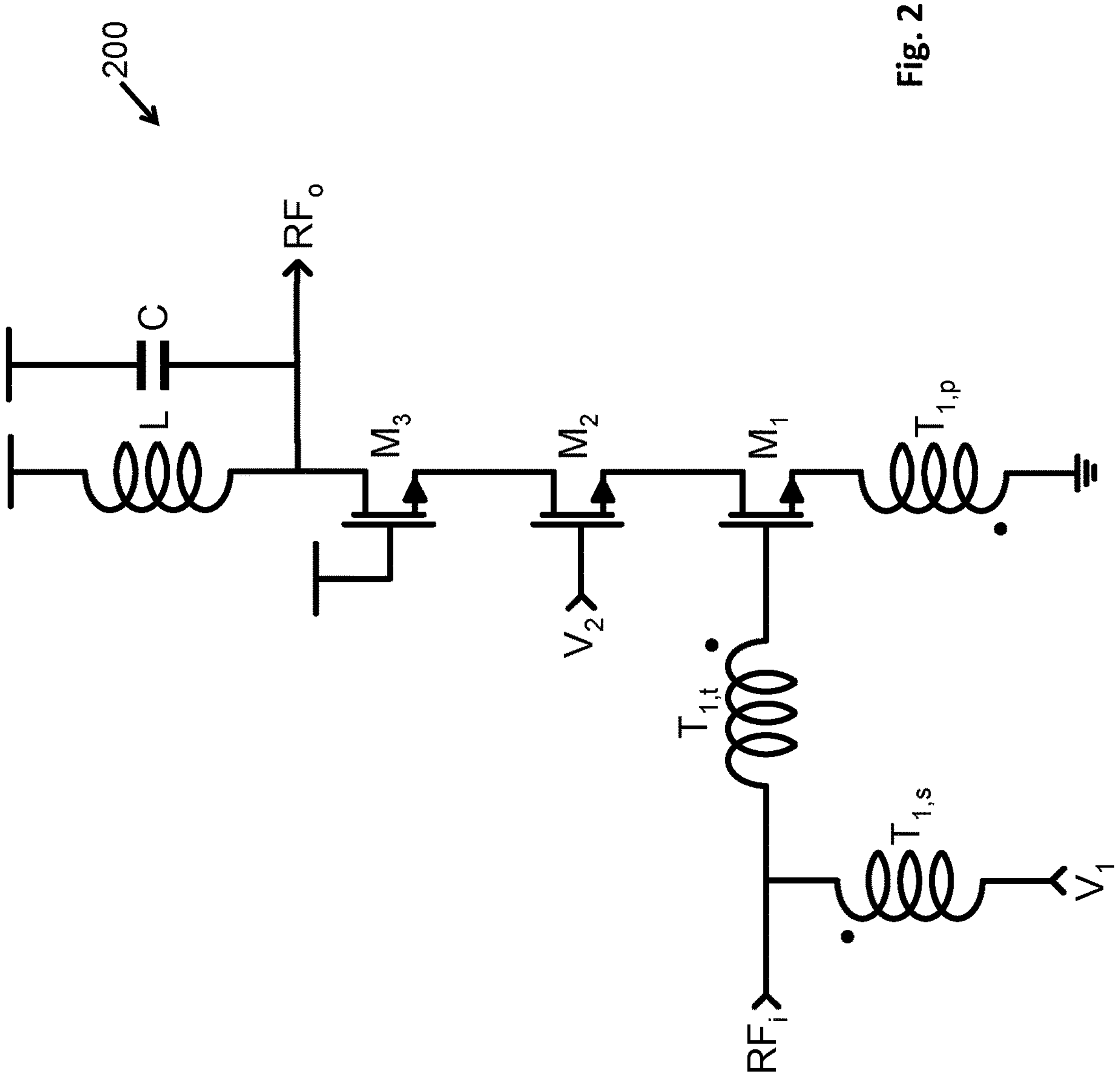

FIG. 2 shows the basic construction of a common-source amplifier 200 with a trifilar transformer for high gain and impedance matching. For maximum gain, the primary winding $T_{1,p}$ is coupled to the secondary winding $T_{1,s}$ and the secondary winding $T_{1,s}$ is coupled to the tertiary winding $T_{1,t}$. However, the tertiary winding $T_{1,t}$ is not coupled to the primary winding $T_{1,p}$ so as to ensure maximum gain of the amplifier. The turns ratios of $T_{1,p}$ to $T_{1,s}$ and $T_{1,s}$ to $T_{1,t}$ also affect the impedance matching of the amplifier and therefore both the gain and the impedance matching can be set as desired. The three windings $T_{1,p}$, $T_{1,s}$ and $T_{1,t}$, together with the field effect transistor $M_1$ in common-source arrangement form the impedance matching amplifier. Stacked on top of that amplifier are two common-gate stages each comprising a field effect transistor $M_2$ or $M_3$ to increase the output impedance. The topmost common-gate stage transistor $M_3$ improves reverse isolation by providing a high output impedance and thereby isolating the load (represented by inductor L and capacitor C) from the common-source amplifier stage $M_1$. Note that both common-gate stages $M_2$ and $M_3$ are always-ON. These are not arranged to be switchable. The output $RF_o$ of the amplifier 400 is taken from above the tertiary winding $T_{1,t}$ such that the tertiary winding $T_{1,t}$ lies between the output $RF_o$ and the drain of $M_1$.

Figure 3A:
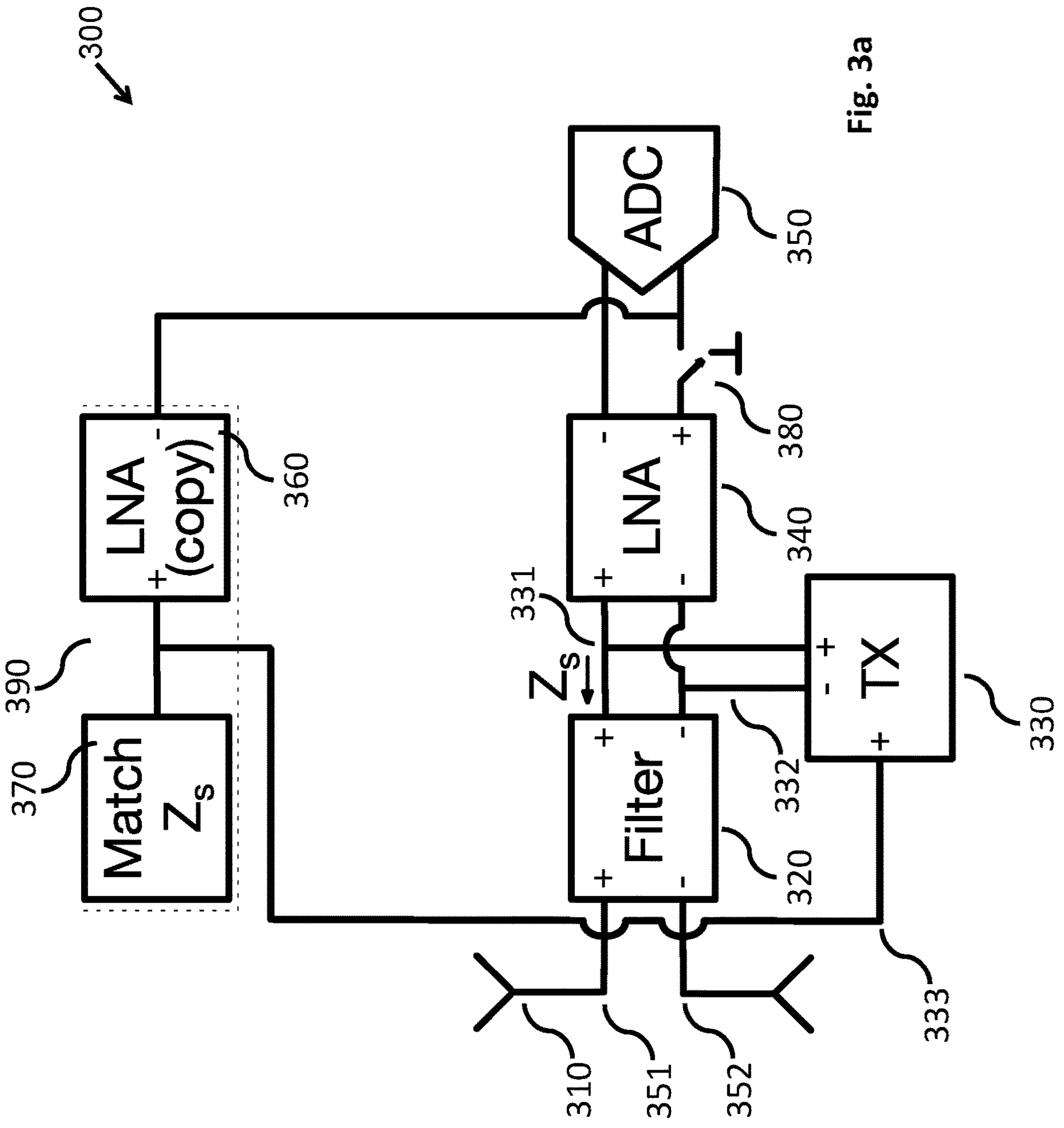

FIG. 3*a* shows a schematic block diagram of a transceiver circuit 300 according to an embodiment of the invention. A differential antenna 310 is arranged to transmit signals generated by the transceiver circuit 300 as well as to receive signals to be processed by the transceiver circuit 300. The transceiver circuit 300 is differential, comprising a first differential path 351 and a second differential path 352. It will be appreciated that these are normally considered to be a positive path and a negative path. In FIG. 3*a* the first differential path 351 is the positive path and the second differential path 352 is the negative path. However, the paths could be the other way round without affecting operation. The signal polarity is shown with '+' and '−' signs in the filter 320 and the LNA 340. Note that there is a signal inversion through the LNA 340 in this particular embodiment.

A differential filter 320 is connected to the differential antenna 310. The differential filter 320 is bidirectional such that it filters the incoming receive signal from the antenna 310 and also filters the transmit signal from transmitter 330 before passing it to the antenna 310. The type of filter and frequency response will depend on the field of operation of the circuit, but in most cases the filter 320 will be a high pass filter or a band pass filter, optionally with one or more notches to exclude undesired interferers. In the case of UWB applications such as UWB pulsed radars, the filter 320 may be designed to ensure that the transmitted signal conforms to the regulatory frequency mask (e.g., 3.1-10.6 GHz in the USA).

Receive signal that passes through the filter 320 then passes to a differential low-noise amplifier (LNA) 340 which amplifies the signal for improved processing by downstream components. In this document the term "downstream" is used with respect to the receive signal such that the LNA 340 is downstream from the filter 320 which is in turn downstream from the antenna 310.

A differential transmitter 330 is connected between the differential filter 320 and the differential LNA 340 such that it can provide signals 331, 332 onto the first differential signal path 351 and the second differential signal path 352 which then pass through the differential filter 320 and are transmitted from the antenna 310. It will be appreciated that this filter connection arrangement corresponds to that shown in FIG. 1*a*, but the invention applies equally to other embodiments in which the differential transmitter 330 is connected between the differential antenna 310 and the differential filter 320 as is shown in FIG. 1*b*.

Downstream of the differential LNA 340, FIG. 3*a* shows an ADC 350, although this could be any general differential output which could be any suitable processing components which have high common-mode rejection. The exact form of the output will vary from one application to another, but by way of example, in this embodiment it comprises an ADC 350 which may be connected to a digital signal processor to process the received signals.

Alongside the main differential signal paths 351, 352, FIG. 3*a* shows an injection circuit 390. Injection circuit 390 provides a path to connect a copy 333 of the first transmit signal 331 to the second differential signal path 352 downstream of the LNA 340 and downstream of a switching network 380. The copy 333 of the first transmit signal 331 is, in this example, generated by the same transmitter 330 as generates the first transmit signal 331 that is connected to the first differential signal path 351. Thus, the two signals 331, 333 can be generated to be identical (or very nearly identical). This is important as the idea is to use these two signals to cancel each other out later in the processing. The injection circuit 390 comprises a dummy amplifier 360 and an impedance matching network 370. The purpose of these is to make sure that the path of the copy signal 333 through the injection circuit 390 mimics the path of the first transmit signal 331 through the first differential signal path 351. Thus, at the point where the injection circuit 390 injects the amplified copy signal 333 onto the second differential signal path 352, it is identical (or very nearly identical) to the amplified first transmit signal on the first differential signal path 351. To achieve this, the dummy amplifier 360 is designed to amplify the copy signal 333 in exactly the same way as the LNA 340 amplifies the first differential signal path 351, e.g., it has the same gain and the same frequency response. One way to do this is for the dummy amplifier 360 to be an identical design to one differential half of the differential LNA 340. Thus, the dummy amplifier 360 can have the same type and size of transistors as one differential half of the differential LNA 340. The two amplifiers 360, 340 have the same biasing conditions. The impedance matching network 370 simulates the input impedance of one differential half of the LNA 340. The impedance matching network 370 may be a resistive-capacitive network or a resistive-inductive network or a resistive-capacitive-inductive network. The impedance matching network 370 is ideally trimmable so that it can be adjusted to match the impedance as exactly as possible and thereby ensure correspondence of the transmit signals on the two differential paths 351, 352 at the output 350. The impedance matching network 370 should ideally match both real and imaginary parts of the impedance on the first differential signal path 351 at the input to the LNA 340.

The switching network 380 is provided on the second differential signal path 352 downstream of the LNA 340 and is capable of diverting the signal on the second differential signal path 352 to ground (note that this only needs to be a signal ground rather than a DC ground, so it can be a connection to a power rail such as $V_{dd}$). More generally, signal ground can be any ground to which the signal can be dissipated. This may be a positive or negative voltage rail, an AC ground, or any other ground connection of the circuit. This leaves the second differential signal path 352 downstream of the switching network 380 disconnected from the rest of the receive architecture (i.e., disconnected from the antenna 310, filter 320 and LNA 340. Diverting the second differential signal path 352 to ground therefore also changes the receiver from differential to single-ended (as receive signal is now only present on the first differential signal path 351). In place of the diverted signal on the second differential signal path 352, the injection circuit provides the amplified copy signal 333 which should match exactly the first transmit signal 331 from the differential transmitter 330 that has passed through the LNA 340. Therefore, at this point in the transceiver circuit 300 (i.e., at the input to the differential output block (e.g., ADC 350), both the first differential signal path 351 and the second differential signal path 352 have identical (or very nearly identical) copies of the amplified first transmit signal 331. Any downstream processing that has high common-mode rejection will eliminate these identical signals and all that is left will be any receive signal present on the first differential signal path 351.

Although this process results in the loss of half the differential receive signal that is received by the differential antenna 310 (i.e., the loss of the half that is diverted to ground by the switching network 380), the big advantage of this transceiver circuit is that it can continue to receive even while transmitting. Thus, the transceiver circuit 300 can operate in a pseudo-full-duplex mode. We refer to this as pseudo-full-duplex rather than full-duplex as the circuit 300 needs to throw away half the received signal during the transmit pulse. Notably, this pseudo-full-duplex operation is all possible with a single differential antenna 310 rather than the two separate antennae that are normally used for full duplex operation.

When the transceiver 300 is not transmitting (which may be most of the time in a pulsed system such as a pulsed radar), the switching network 380 can be switched to not divert the signal to ground, e.g., to connect the second differential signal path 352 to the output (e.g., output block 350). In this mode of operation, the receive signal is received and processed fully-differentially throughout the path from antenna 310 to output 350 and therefore preserves the full signal swing of the received signal for optimal processing. In this mode the injection circuit has no effect as no copy signal 333 is produced by the transmitter 330.

Figure 3B:
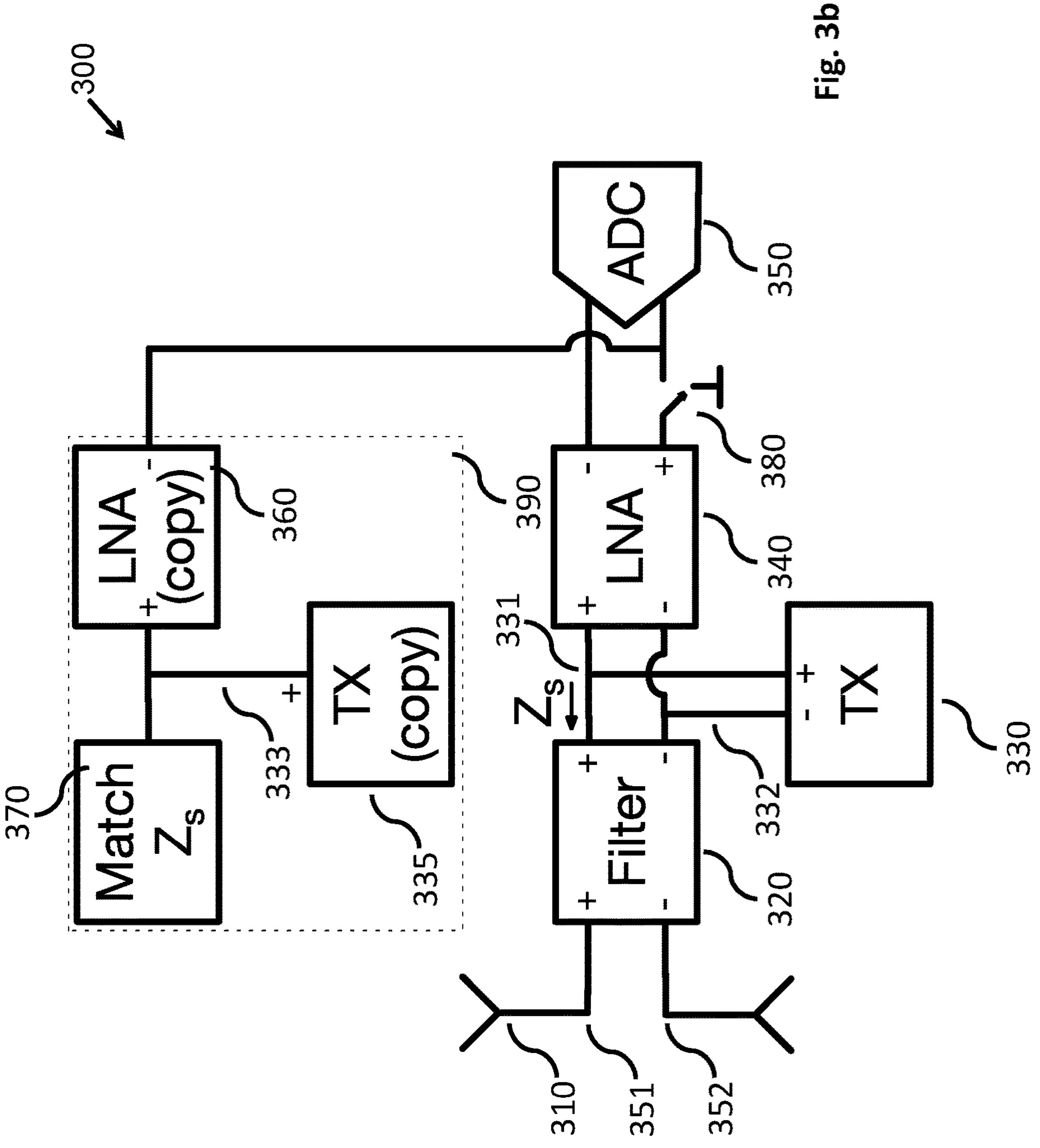

FIG. 3*b* is identical in most respects to FIG. 3*a* and most of its description is therefore omitted here. The difference is that instead of the transmitter 330 generating the copy signal 333, a separate dummy transmitter 335 is provided as part of the injection circuit 390. The dummy transmitter 335 is a copy of the one half of the differential transmitter 330, i.e., it may be identical to one differential half of the differential transmitter 330 and thus the dummy transmitter 335 generates an identical signal to the first transmit signal 331, i.e., it generates the copy 333 of the first transmit signal 331.

Figure 4:
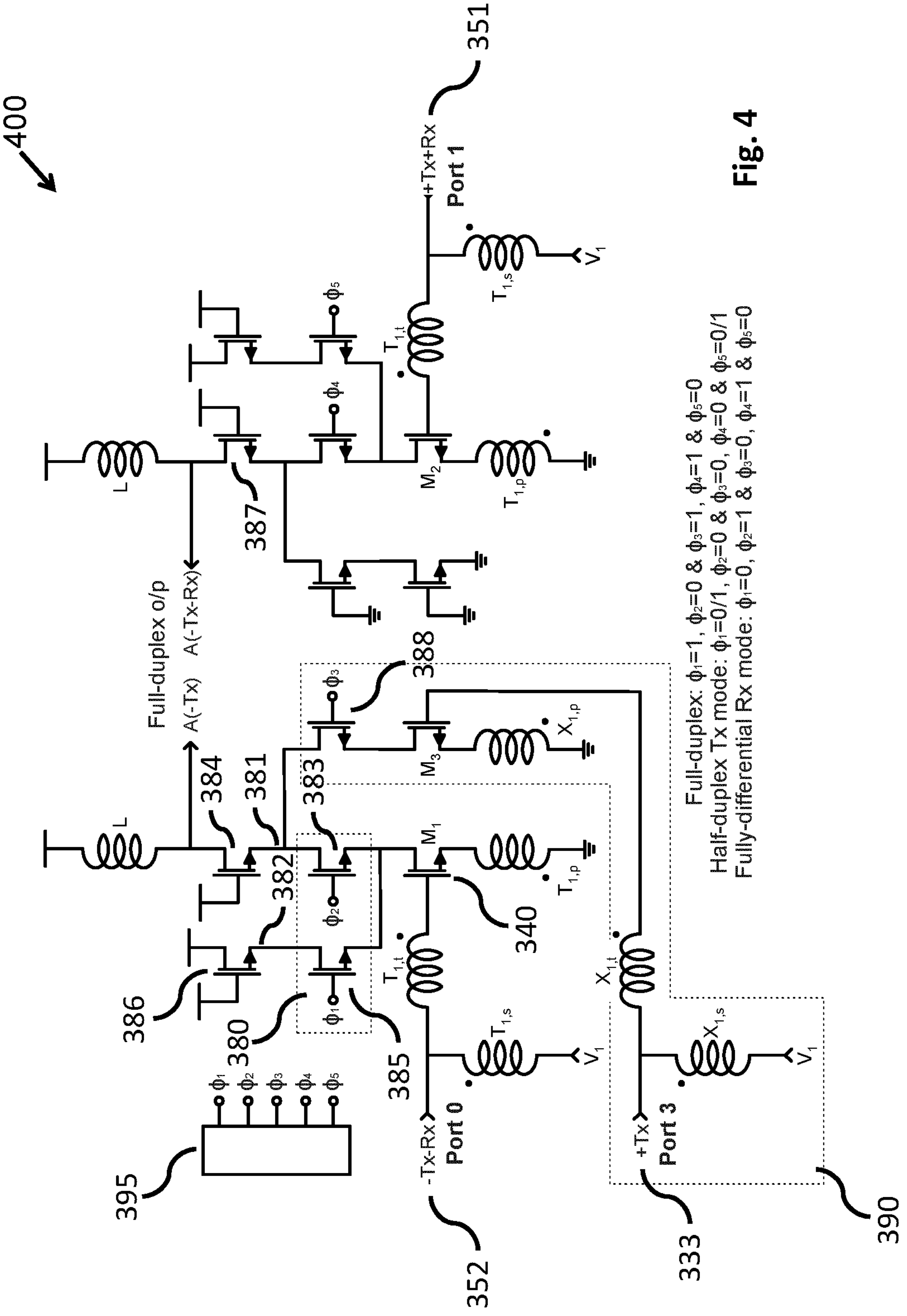
FIG. 4 shows one embodiment of the invention.

FIG. 4 shows a first implementation of the LNA 340 and injection circuit 390 of the transceiver circuit 300 at transistor level. The antenna 310, filter 320 and transmitter 330 are not shown here for simplicity, but for reference, the first differential signal path 351 from the output of the filter 320 and the transmitter 330 is provided at Port 1. The second differential signal path 352 from the output of the filter 320 and the transmitter 330 is provided at Port 0. The copy signal 333 of the first transmit signal 331 is provided at Port 3.

The inputs at Port 0 and Port 1 are the differential input to the differential LNA 340. In FIG. 4, each differential half of the differential LNA 340 is implemented by a field effect transistor $M_1$, $M_2$ arranged in common-source configuration and with a trifilar transformer connected to its terminals for enhancing the gain and impedance matching. The trifilar transformer on $M_1$ comprises a primary winding $T_{1,p}$ connected to the source of $M_1$, a secondary winding $T_{1,s}$ connected between the gate of $M_1$ and ground (signal ground, in this case a DC bias voltage $V_1$) and a tertiary winding $T_{1,t}$ connected between the secondary winding and the gate of $M_1$. Mutual coupling between the primary winding and the secondary winding with inverting relationship enhances the gate-source voltage, thereby enhancing the gain of $M_1$. Mutual coupling between the secondary winding $T_{1,s}$ and the tertiary winding $T_{1,t}$ further enhances the gate voltage of $M_1$ and thereby further enhances the gain. The coupling between the primary winding $T_{1,p}$ and the tertiary winding $T_{1,t}$ is ideally kept as low as possible, and with the right trifilar set up can be largely eliminated for maximum gain. As the input impedance of the amplifier depends on the transconductance $g_m$ of $M_1$ as well as the turns ratios of the trifilar windings, the gain can be optimized while also ensuring correct impedance matching. It will be appreciated that the arrangement of $M_2$ on the first signal path 351 is exactly the same.

At the output of the amplifier 340 (i.e., at the drain of $M_1$), a switching network 380 is provided which has a first circuit branch 381 connecting the output of the amplifier to the load (represented here by inductors L, i.e., the transceiver circuit output) and a second circuit branch 382 which diverts the output of the amplifier to a signal ground (in this case the supply rail $V_{dd}$). The first circuit branch 381 comprises a first switch 383 in series with a first buffer element 384. The second circuit branch 382 comprises a second switch 385 in series with a second buffer element 396. Each of the buffer elements 384, 386 is arranged in common-gate arrangement such that they are always-ON. The first buffer element 384 provide a high output impedance and good reverse isolation such that the load does not affect the biasing (and thus impedance matching) of the amplifier 340. The first switch 383 and the second switch 385 provide the means by which to select whether to divert or not divert the amplifier output to the signal ground node. When the first switch 383 is ON and the second switch 385 is OFF, the amplifier output (and thus the second differential signal path 352) is connected to the load (transceiver circuit output). When the first switch 383 is OFF and the second switch 385 is ON, the amplifier output (and thus the second differential signal path 352) is connected to the signal ground node (e.g., $V_{dd}$). The first switch 383 is identical to the second switch 385 and the second buffer element 386 is identical to the first buffer element 384. Identical here means the same characteristics such as size and strength. The two circuit branches 381, 382 are identical so that the amplifier 340 always sees an identical load regardless of which path is connected. This ensures that the biasing of the amplifier 340 (and thus its impedance matching) is not affected by switches between the transmit mode and the receive mode, i.e., when the switching network 380 changes state.

While the main function of the switching network is to select one path to connect the amplifier output to (i.e., so that one switch is ON and the other is OFF), it will be appreciated that it is also possible to switch both the first switch 383 and the second switch 385 ON so as to divide the signal with half going to ground and half going to the transceiver circuit output. Such operation may be useful in receive mode if a particularly strong signal is amplified too much by the amplifier 340. Connecting both circuit branches 381, 382 in parallel provides a degree of gain control to reduce the signal amplitude at the transceiver circuit output.

It will be appreciated that the structure at the output of transistor $M_2$ on the first differential signal path is identical to that described above and is therefore not described further here, except to note that the switching network on this path is generally not used for diverting the signal unless it is desired to switch the whole receiver side off (e.g., for half-duplex operation). The switching network here still has functionality though as it provides symmetry with the switching network on the second differential signal path.

The injection circuit 390 is shown from the input at Port 3 (which takes the copy 333 of the first transmit signal 331 from the transmitter) to the connection at the node on first circuit branch 381 between the first switch 383 and the first buffer element 384 where the injection signal is injected onto the second differential signal path 352 downstream of the first switch 383. The injection circuit 390 has components identical to those on the second differential signal path 352 as described above. Thus, the injection circuit 390 includes an amplifier which comprises a field effect transistor $M_3$ in common-source arrangement with a trifilar transformer $X_1$ connected to its terminals. The transistor $M_3$ is identical to transistor $M_1$ and the windings of the trifilar transformer $X_1$ are identical to those of transformer $T_1$, i.e., $T_{1,p}=X_{1,p}$, $T_{1,s}=X_{1,s}$, $T_{1,t}=X_{1,t}$. As the amplifier components are identical on the injection circuit 390 to those on the second differential signal path 352, the outputs should be identical. Notably, the amplifier $M_2$ and the trifilar windings connected to it are also identical to those of $M_1$ and $M_3$ so that a transmit signal sent along any of these three routes should be processed (e.g., amplified) identically.

As indicated in FIG. 4, when the injection circuit 390 is in operation, the receive signal at Port 1 on the first signal path 351 includes both the positive receive signal +Rx from the positive arm of the antenna and the positive transmit signal 331, +Tx from the positive arm of the transmitter 330. The receive signal at Port 0 on the second signal path 352 includes the negative receive signal −Rx from the negative arm of the antenna and the negative transmit signal 332, −Tx from the negative arm of the transmitter 330. Port 3 of the injection circuit 390 receives the copy signal 333 from the transmitter 330 or the dummy transmitter 335. The first switch 383 is OFF so as to block the output at the drain of $M_1$ from progressing to the load. Instead, the second switch 385 is ON thereby diverting the output at the drain of $M_1$ to signal ground (the supply rail $V_{dd}$) through the buffer element 386. The injection circuit injects its output onto the node on first circuit branch 381 between the first switch 383 and the first buffer element 384. Now, as shown at the top of FIG. 4 between the inductors, the differential output is the difference between the output at the drain of buffer element 384 and the output at the drain of third buffer element 387 on the opposite signal path. The output at the drain of first buffer element 384 is A(−Tx). A( ) represents the amplification factor of the LNA 340 (or the dummy LNA 360) and the negative sign is because the amplifier in this example causes signal inversion (+Tx at the input becomes −Tx at the output). The output at the drain of third buffer element 387 is A(−Tx−Rx). A( ) is the same amplification factor (because the amplifier in the injection circuit 390 is designed to be identical to the amplifier on the first differential signal path 351) and the negative signs are again because the amplifier in this example causes signal inversion (+Tx+Rx at the input becomes −Tx−Rx at the output). Therefore, the differential output is A(−Tx)−A(−Tx−Rx)=A(−Rx). Therefore, the transmit signal has been fully cancelled and the remaining signal is just the single-ended receive signal from the first differential signal path 351 which can be processed even during the transmit operation, thereby effecting a pseudo-full-duplex operation.

The switches 383 and 385 on the second signal path 352 are controlled by control signals $\phi_2$ and $\phi_1$ respectively. The corresponding switches on the first signal path are controlled by control signals $\phi_4$ and $\phi_5$ respectively. The switch 388 on the injection circuit 390 is controlled by control signal $\phi_3$. All of these control signals may be generated by controller 395.

For normal receive mode operation, the injection circuit is not required, so $\phi_3$ is 'low' (OFF). The signals on both differential signal arms 351, 352 are connected to the output to pass receive signal, so $\phi_2$ and $\phi_4$ are 'high' (ON). No signal is to be diverted to ground, so $\phi_1$ and $\phi_5$ are 'low' (OFF).

For full-duplex or pseudo-full-duplex mode operation, the first differential signal path passes the signal as normal, with no diversion to ground, so control signal $\phi_5$ is 'low' (OFF) and control signal $\phi_4$ is 'high' (ON). The second differential signal path 352 diverts the received signal to signal ground, so control signal $\phi_2$ is 'low' (OFF), while control signal $\phi_1$ is 'high' (ON). The injection circuit 390 is active to inject the copy signal 333 onto the second signal path 352 so control signal $\phi_3$ is 'high' (ON). The circuit can also be operated in half-duplex mode if desired. For half-duplex mode operation, the injection circuit 390 is not used and so control signal $\phi_3$ is 'low' (OFF). During receive mode, the control signals $\phi_2$ and $\phi_4$ are 'high' (ON) so as to pass the receive signal, while control signals $\phi_1$ and $\phi_5$ can be either 'low' (OFF) for full receive mode or 'high' (ON) for gain control mode. During transmit mode, the receiver is simply blocked and so signals $\phi_2$ and $\phi_4$ are 'low' (OFF), and signals $\phi_1$ and $\phi_5$ can be either 'low' (OFF) or 'high' (ON). Only for the latter is the amplifier impedance matched (i.e., it sees proper biasing conditions) and therefore this option is preferred in some embodiments.

Figure 5:
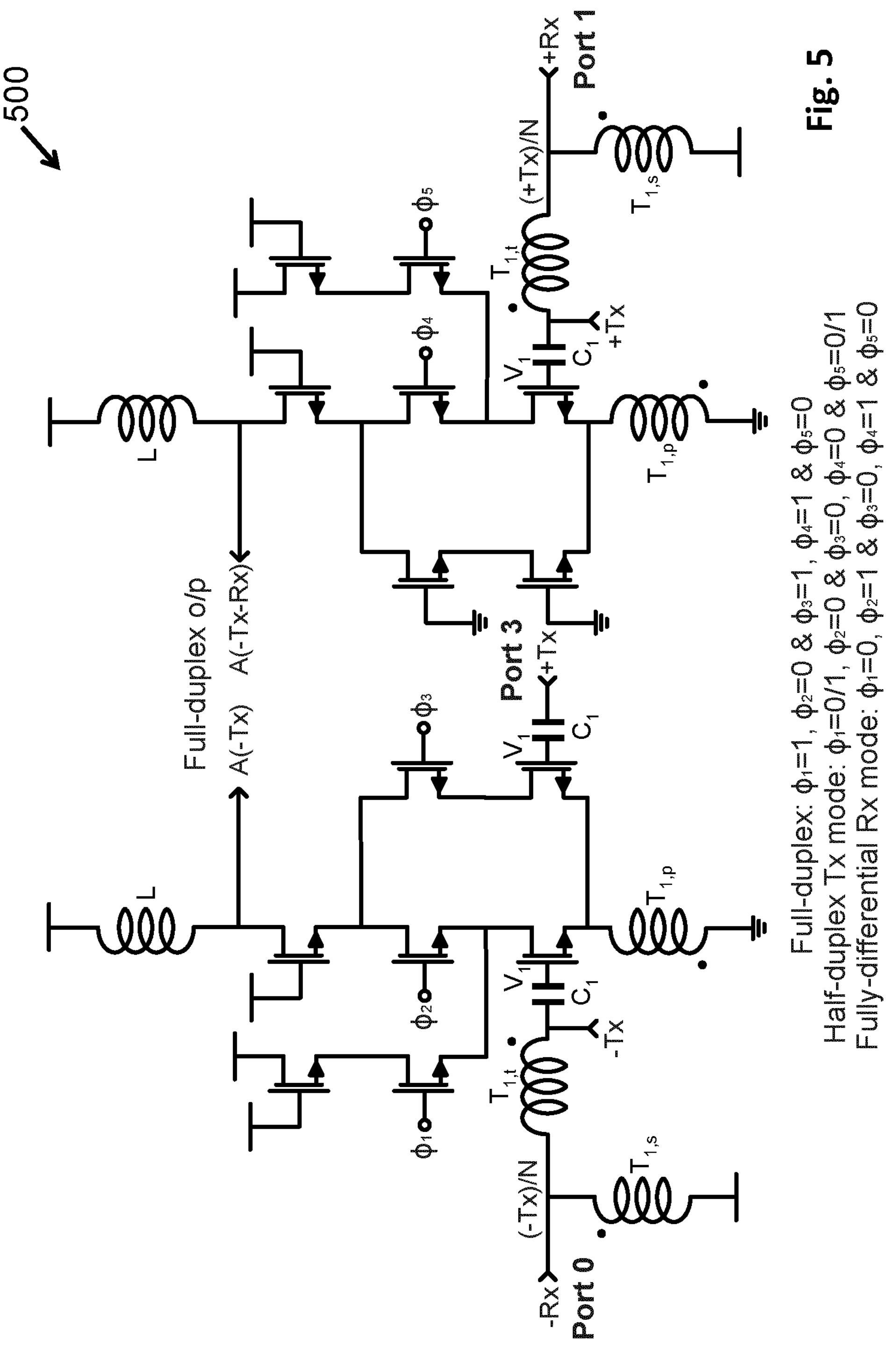
FIG. 5 shows another embodiment of the invention.

FIG. 5 shows a second implementation of the LNA 340 and injection circuit 390 of the transceiver circuit 300 at transistor level. FIG. 5 is very similar to FIG. 4 and therefore much of the description is omitted here and only the different arrangement of the injection circuit 390 is described.

In FIG. 5, the transmit signal (the first transmit signal 331 and the second transmit signal 332 as well as the copy transmit signal 333) can be applied directly to the gates of $M_1$, $M_2$, and $M_3$. This reduces complexity and area as trifilar transformer $X_1$ is not required. For near perfect transmit signal cancellation, the impedance at the gate of $M_3$ must be equal to the impedance at the gate of $M_1$ (or $M_2$). This is achieved via an impedance matching network as shown in FIG. 3*a* and FIG. 3*b* (but not shown in FIG. 5 for simplicity). In addition, with the transmit signal applied directly at the gates of $M_1$, $M_2$, and $M_3$, the off-capacitance of the transmitter, Tx, becomes a greater concern due to its effect being amplified through the secondary and tertiary windings $T_{1,s}$, $T_{1,t}$. Effectively the off-capacitance of the transmitter that is seen at the antenna is multiplied up by a factor that depends on the turns ratios. Therefore, this arrangement is particularly beneficial when the off-capacitance of the transmitter is low, i.e., low enough that this effect does not e.g., degrade the impedance match or increase insertion loss.

Figure 6:
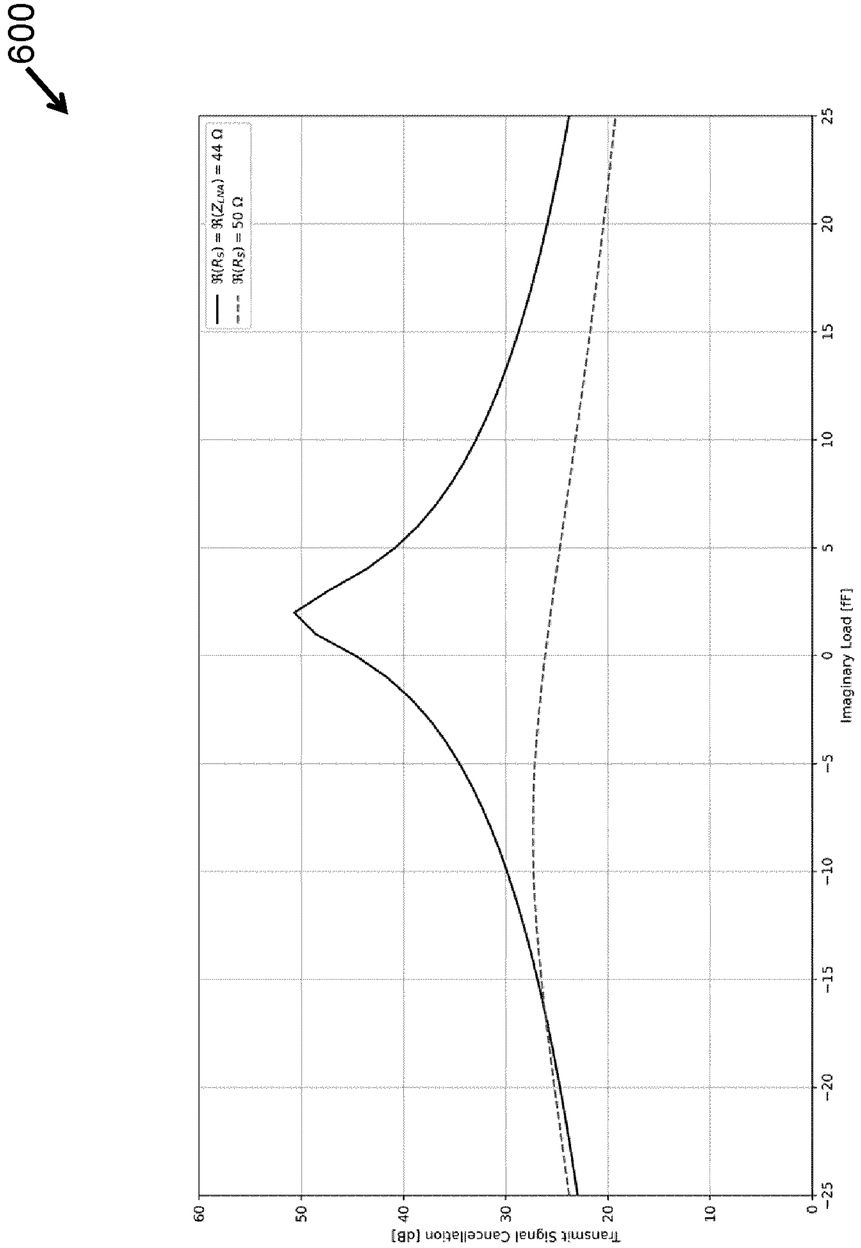
FIG. 6 is a graph showing the level of transmit cancellation with varying impedances.

FIG. 6 is a graph showing the level of transmit signal cancellation (on the vertical axis) that can be achieved by embodiments of the invention. The horizontal axis shows imaginary load in Femtofarads (fF), and the two curves show how the cancellation varies for two different resistances (one shows 44 Ohms, the other 50 Ohms). Both curves show a good level of cancellation. For example, a 20 dB cancellation is considered a realistic target level of cancellation to achieve (a factor of 10 reduction) and both curves achieve this across nearly the full range of imaginary impedances shown on the graph. However, there is a clear benefit when the real part of the impedance is matched more effectively. In this case, the 44 Ohm real impedance has a pronounced peak around 3 fF where a cancellation of 50 dB can be achieved. With this real impedance, an imaginary impedance of anywhere between 0 and 5 fF achieves greater than 40 dB of cancellation.

Figure 7:
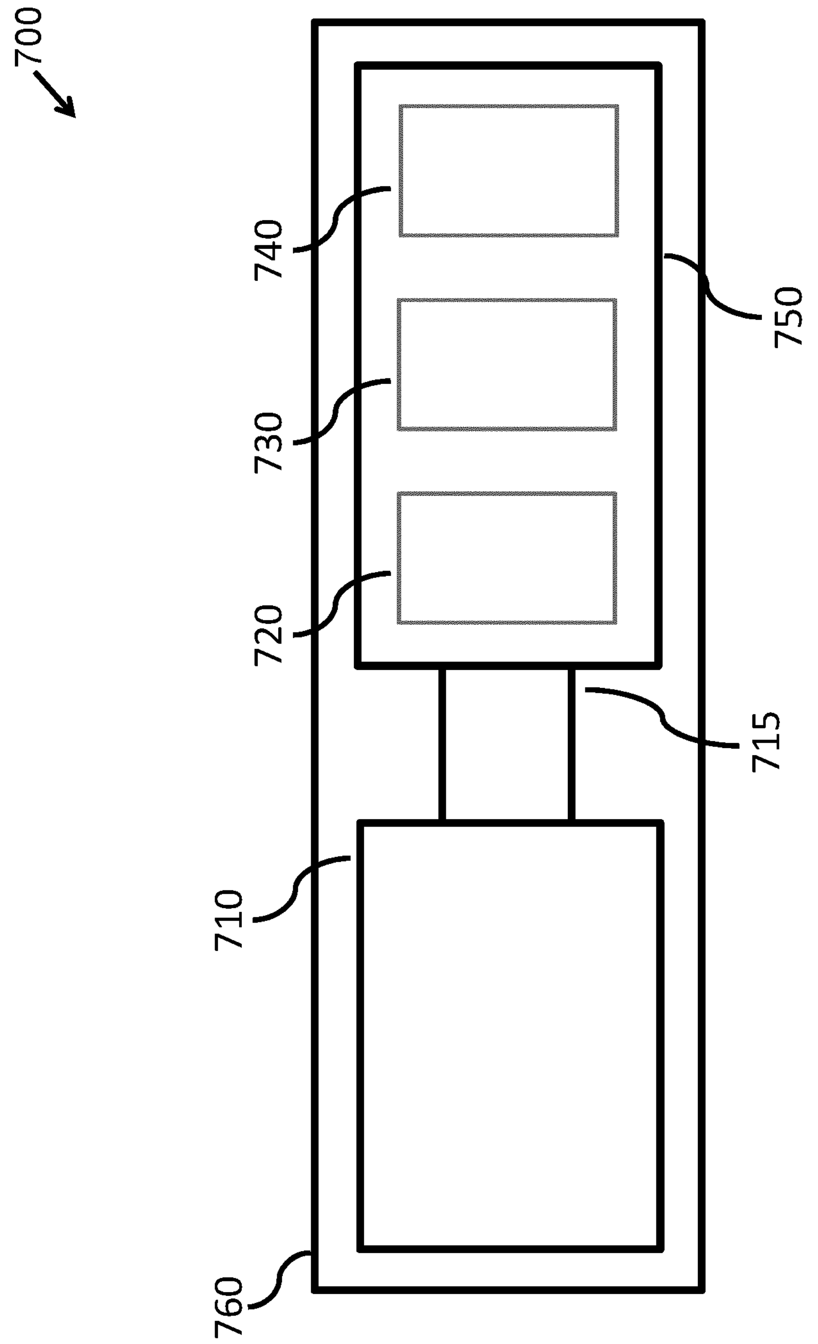
FIG. 7 shows schematically the components of a pulsed radar module.

FIG. 7 shows a pulsed (or impulse) radar 700 which comprises a module 760 on which is mounted an antenna 710 and a semiconductor chip 750. The antenna 710 connects to the semiconductor chip 750 via an antenna interface 715. The semiconductor chip 750 contains a filter 720, a transmitter 730 and an amplifier 740 which may be circuits as described above and shown in the preceding figures. In this embodiment the antenna 710, antenna interface 715, filter 720, transmitter 730 and amplifier 740 are all differential.

It will be appreciated that variations and modifications of the above circuits may be made without departing from the scope of the appended claims.

The invention claimed is:

1. A differential transceiver circuit for transmitting and receiving via a single antenna interface, the transceiver circuit comprising:
- a differential pair of signal paths, comprising a first signal path and a second signal path;
- a differential amplifier, having an input and an output, the input arranged to receive a receive signal from the antenna interface;
- a differential transmitter arranged to generate a differential pair of transmit signals for transmission to the antenna interface, the differential pair of transmit signals comprising a first transmit signal connected to the first signal path between the antenna and the receiver input and a second transmit signal connected to the second signal path between the antenna and the receiver input;
- a switching network on the second signal path arranged on the output side of the differential amplifier and arranged to divert the amplifier output on the second signal path to a signal ground node; and
- an injection circuit arranged to inject a copy of the first transmit signal onto the second signal path downstream of the switching network.

2. A differential transceiver circuit as claimed in claim 1, wherein the switching network comprises a first switch arranged to selectively connect the second signal path to a transceiver circuit output, and a second switch arranged to selectively connect the second signal path to the signal ground node.

3. A differential transceiver circuit as claimed in claim 1, wherein the injection circuit comprises an injection switch arranged to selectively connect the injection circuit to the second signal path.

4. A differential transceiver circuit as claimed in claim 1, wherein the injection circuit obtains the copy of the first transmit signal directly from the differential transmitter.

5. A differential transceiver circuit as claimed in claim 1, wherein the injection circuit comprises a dummy transmitter circuit substantially identical to one differential half of the differential transmitter, and which is arranged to generate the copy of the first transmit signal.

6. A differential transceiver circuit as claimed in claim 1, wherein the injection path comprises a dummy amplifier.

7. A differential transceiver circuit as claimed in claim 6, wherein the dummy amplifier is substantially identical to one differential half of the differential amplifier.

8. A differential transceiver circuit as claimed in claim 1, wherein the injection path comprises an impedance matching network arranged to match the impedance seen by the copy of the first transmit signal on the injection path to the impedance seen by the first transmit signal on the first signal path.

9. A differential transceiver circuit as claimed in claim 8, wherein the impedance matching network is trimmable.

10. A differential transceiver circuit as claimed in claim 8, wherein the impedance matching network is a resistive-capacitive network.

11. A differential transceiver circuit as claimed in claim 8, wherein the impedance matching network is a resistive-capacitive-inductive network.

12. A differential transceiver circuit as claimed in claim 1, further comprising a controller, the controller arranged such that, during a transmit pulse, it:

controls the switching network to divert the amplifier output on the second signal path to the signal ground node; and controls the injection circuit to inject the copy of the first transmit signal onto the second signal path.

13. A transceiver circuit as claimed in claim 2, wherein the switching network comprises a first circuit branch which comprises a first buffer element in series with the first switch.

14. A transceiver circuit as claimed in claim 13, wherein the first buffer element is connected between the first switch and the transceiver circuit output.

15. A transceiver circuit as claimed in claim 13, wherein the first switch and the first buffer element each comprise transistors in a common-gate arrangement.

16. A transceiver circuit as claimed in claim 2, wherein the switching network comprises a second circuit branch which comprises a second buffer element in series with the second switch.

17. A transceiver circuit as claimed in claim 16, wherein the second buffer element is connected between the second switch and the signal ground node.

18. A transceiver circuit as claimed in claim 16, wherein the second switch and the second buffer element each comprise transistors in a common-gate arrangement.

19. A transceiver circuit as claimed in claim 13, wherein the second switch is identical to the first switch.

20. A transceiver circuit as claimed in claim 16, wherein the second buffer element is identical to the first buffer element.

21. A transceiver circuit as claimed in claim 1, further comprising a controller;

wherein the controller is arranged to operate in at least a transmit mode and a receive mode;

wherein in the transmit mode, the controller controls the switching network to divert the amplifier output on the second signal path to the signal ground node and controls the injection circuit to inject the copy of the first transmit signal onto the second signal path; and wherein in the receive mode, the controller controls the switching network not to divert the amplifier output on the second signal path to the signal ground node and controls the injection circuit not to inject the copy of the first transmit signal onto the second signal path.

22. A transceiver circuit as claimed in claim 1, wherein the differential amplifier is an impedance matching amplifier arranged to receive the receive signal from the antenna interface and arranged to output an amplified differential signal on the first and second signal paths.

23. A transceiver circuit as claimed in claim 22, wherein the impedance matching amplifier has two differential halves, and each differential half comprises a transistor or multiple transistors arranged in a common-gate and/or a common-source arrangement.

24. A transceiver circuit as claimed in claim 23, wherein the transistor of each differential half comprises a field effect transistor and wherein each differential half of the impedance matching amplifier further comprises a transformer coupling the signal between the gate and the source of the field effect transistor.

25. A transceiver circuit as claimed in claim 24, wherein each field effect transistor is in common-source arrangement and each differential half of the impedance matching amplifier comprises a transformer arranged to amplify the signal at the gate of the field effect transistor.

26. A transceiver circuit as claimed in claim 24, wherein the transformer on each differential signal path is a trifilar transformer with a primary winding connected to the source, a secondary winding connected between the gate and signal ground and a tertiary winding connected between the secondary winding and the gate, wherein the primary winding and the secondary winding are coupled in inverting relationship, wherein the secondary winding and the tertiary winding are coupled to increase voltage at the gate, and wherein there is substantially no coupling between the primary winding and the tertiary winding.

27. A transceiver circuit as claimed in claim 24, wherein the field effect transistor is in common-gate arrangement and each differential half of the impedance matching amplifier comprises a transformer coupling the signal between the source and the drain of the field effect transistor.

28. A transceiver circuit as claimed in claim 27, wherein the transformer on each differential signal path is a trifilar transformer with a primary winding connected to the source, a secondary winding connected to the gate and a tertiary winding connected to the drain, wherein the primary winding and the secondary winding are coupled in an inverting relationship and wherein the primary winding and the tertiary winding are coupled in non-inverting relationship, and wherein there is substantially no coupling between the secondary winding and the tertiary winding.

29. A transceiver comprising:

a transmitter circuit, an antenna, a transceiver circuit as claimed in claim 1.

30. A transceiver as claimed in claim 29, wherein the transmitter circuit comprises an impulse or pulse generator.

31. A pulsed radar comprising a transceiver as claimed in claim 30.

32. A method of duplex operation of a differential transceiver circuit via a single antenna interface, wherein the transceiver circuit comprises:

a differential pair of signal paths, comprising a first signal path and a second signal path; and a differential amplifier, having an input and an output, the input arranged to receive a differential receive signal from the antenna interface;

the method comprising:

transmitting a differential signal to the antenna interface, comprising a first transmit signal on the first signal path and a second transmit signal on the second signal path;

receiving a differential receive signal on the differential pair of signal paths via the antenna interface;

diverting the receive signal on the second signal path from the output side of the differential amplifier to a signal ground node; and injecting a copy of the first transmit signal onto the second signal path in place of the diverted receive signal.

* * * * *